United States Patent [19]

Jackson

[11] Patent Number: 5,163,204
[45] Date of Patent: Nov. 17, 1992

[54] MARINE DOOR MOVEMENT CONTROL APPARATUS

[76] Inventor: Christopher B. Jackson, 240 4th St. South, Naples, Fla. 33939

[21] Appl. No.: 669,354

[22] Filed: Mar. 14, 1991

Related U.S. Application Data

[63] Continuation-in-part of Ser. No. 550,339, Jul. 9, 1990, abandoned.

[51] Int. Cl.⁵ .............................................. E05F 3/00
[52] U.S. Cl. .......................................... 16/84; 16/66; 188/317; 188/282
[58] Field of Search ............... 16/84, 66; 188/316, 188/317, 282, 322.22

[56] References Cited

U.S. PATENT DOCUMENTS

| | | | |
|---|---|---|---|
| 2,421,595 | 6/1947 | Brown | 16/66 |
| 2,702,398 | 2/1955 | Marcus | 16/66 |
| 2,953,810 | 9/1960 | Hall | 16/52 |
| 3,113,644 | 6/1961 | Wossner | 188/100 |
| 3,313,380 | 4/1967 | Person | 16/66 |
| 3,566,434 | 3/1971 | Grinsteiner | 16/66 |
| 4,110,868 | 9/1978 | Imazaike | 16/84 |
| 4,203,507 | 5/1980 | Tomita et al. | 188/317 |
| 4,323,224 | 4/1982 | Freitag et al. | 267/64.12 |
| 4,383,595 | 5/1983 | Schnitzius | 188/281 |
| 4,396,098 | 8/1983 | Petrak | 188/280 |
| 4,558,767 | 12/1985 | Taylor | 188/282 |
| 4,628,579 | 12/1986 | Taylor | 29/422 |
| 4,874,066 | 10/1989 | Silberstein | 188/322 |

*Primary Examiner*—Lowell A. Larson
*Assistant Examiner*—Michael J. McKeon
*Attorney, Agent, or Firm*—R. M. Saccocio

[57] ABSTRACT

Door control apparatus is provided for a sliding door for use with a boat or a ship. The door control apparatus is unbiased in either direction and will substantially maintain any position in which it is placed, except during extreme rolling or pitching of the boat or ship due to heavy weather conditions. The door control apparatus provides for equal but opposite force to open the door as to close the door. The door control apparatus includes piston and cylinder means with fixed orifices. Other than the piston its associated parts, there are no moving parts to the mechanism.

11 Claims, 2 Drawing Sheets

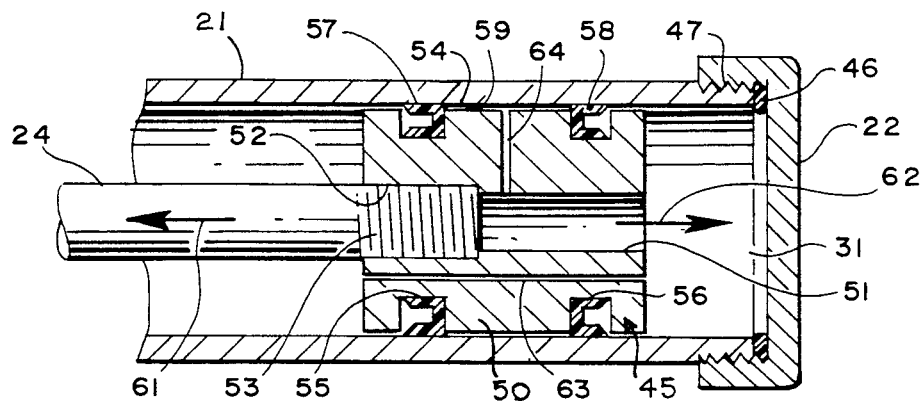
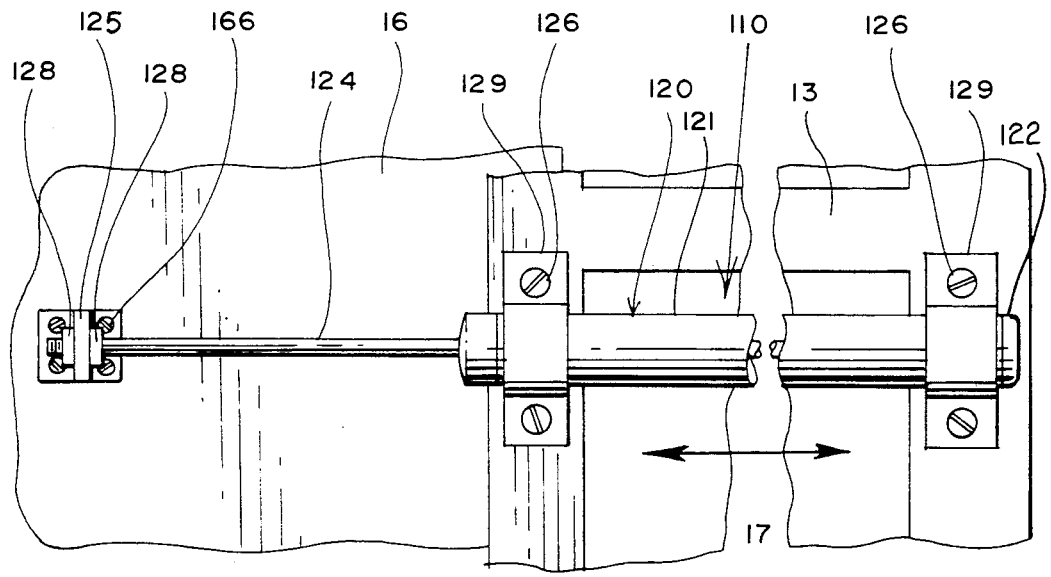
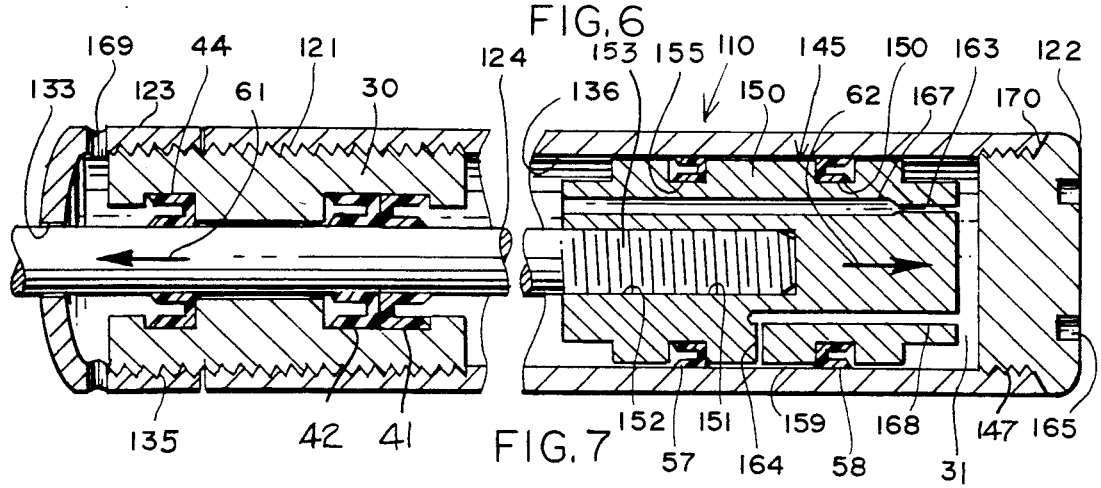

MARINE DOOR MOVEMENT CONTROL APPARATUS

CROSS REFERENCE TO RELATED APPLICATIONS

This application is a continuation-in-part of patent application Ser. No. 07/550,339, filed Jul. 9, 1990, by Christopher B. Jackson, entitled "Marine Door Movement Control Apparatus" assigned to Condor Marine, Inc. and now abandoned.

BACKGROUND OF THE INVENTION

1. Field of the Invention

This invention pertains in general to the field of door control apparatus and in particular to the field of movement control of a sliding marine door which is affected by the rolling and pitching of a boat due to movement of the sea or other body of water within which the boat is in operation.

2. Description of the Prior Art

A number of boat designs include a sliding door between the outside deck of the boat and the inside of a cabin. Such sliding doors are frequently utilized on any type of boat or ship which includes a cabin on the deck thereof. In such applications, a sliding door is preferred over a hinged, swinging type of door because of space requirements and the negative aspects of a hinged door suddenly swinging in either direction due to rolling seas. Indeed, a swinging door could severely injure a person when he or she is trying to enter or exit through such door when the rolling of the boat due to rough seas suddenly swings the door toward the person.

While sliding doors are preferred, they are also subject to rapid opening or closing in an unrestrained condition due to rough seas. Thus, when a sliding door is unlatched, it will slide back and forth in its tracks depending upon the rolling or pitching motion of the boat and the location of the door. The result is that the door slams open or closed with a great deal of force. If a person is attempting to pass through the doorway associated with such a sliding door at the same time the boat is rocking, it is very probable that the person will be injured and the boat be damaged by the rapidly moving edge of the door.

In order to negate the force effects of an unrestrained sliding door, the usual practice is to latch the door either in an open or a closed position. Latching of a sliding door is not, however, a complete solution to the problem. For example, when a latched-shut door is unlatched preparatory to being open to allow a person or persons to pass therethrough, the rocking and/or rolling movement of the boat causes the door to move rapidly in either or both directions. To overcome this effect, the person must hold onto the edge of the door in an attempt to control the forceful motion of the door. Frequently, the person himself is trying to maintain his own balance and trying to control the movement of the door at the same time. Often, the result is a clumsy effort which is not successful and the door may slam against some part of the person causing him serious injury.

With the sliding door latched in an open position, passage therethrough in a safe and orderly manner is assured. But, the negative effects of the door always being open exist. The disadvantages of a latched open door during foul or rainy weather conditions is obvious.

The prior art door movement control apparatus is generally designed or intended to be used with a swinging type of door and whereby the door mechanism is biased in one direction and pressure activated in the other direction. For the most part, the door control apparatus intended for use with a swinging door is not adaptable to a sliding door particularly where the swinging door apparatus includes articulated lever arms. In the category of door control apparatus which is adaptable to a sliding door, that is, those door controls which utilize a piston and cylinder which move in an axial direction, such prior art apparatus do not satisfactorily control the motion of a sliding door on a boat. This is because such door apparatus will bias the door in either the open or closed direction while requiring force to move the door in the other direction. Therefore, with this type of door control apparatus, either a shut door or open door condition is imposed and the opposite condition is achieved by overcoming the biased spring force and the hydraulic pressure force. Accordingly, both an opened and a closed door position is not obtainable with the apparatus of the prior art, nor is a partially opened door condition obtainable.

Accordingly, a primary object of the present invention is to provide a sliding door on a boat or ship with control apparatus which renders the door stable in either an open or a closed condition, or any partially opened or partially closed condition therebetween.

Another object of the present invention is to provide a sliding door on a boat or ship with control apparatus whereby a constant force may be used to open or close the door from either position to the opposite position.

Another object of the present invention is to provide a sliding door on a boat or ship with control apparatus which prevents the door from slamming open or closed as a result of rolling or pitching motion of the boat or ship.

The above-stated objects as well as other objects which, although not specifically stated, but are intended to be included within the scope of the present invention, are accomplished by the present invention and will become apparent from the hereinafter set forth Detailed Description of the Invention, Drawings, and the claims appended herewith.

SUMMARY OF THE INVENTION

The present invention accomplishes the above-stated objectives as well as others, as may be readily determined by a fair reading and interpretation of the entire specification, the appended claims and drawings. Door control apparatus is provided by the present invention for use in conjunction with a sliding door and comprises a piston-cylinder combination having unique force-movement characteristics.

An elongated cylinder which is filled with atmospheric air includes a piston and a piston rod which moves axially within the cylinder in accordance with the direction of the force being applied to the door to which the apparatus is attached. The free end of the piston rod is attached either to the door or to the wall which contains the doorway while an opposite end of the cylinder apparatus is attached to the other of the door or the wall, or vice versa. The cylinder is filled with air, not under pressure, and is contained within the cylinder by means of a sealed end cap on one end of the cylinder and a piston rod seal arrangement in the other. The piston rod seal arrangement within the cylinder allows for motion of the piston rod in and out of the cylinder while maintaining the air within the cylinder. The piston includes a pair of seals oriented in opposite directions with a space therebetween. One each of the seals act in the direction which opposes the applied motion of the piston rod. An axial orifice through the piston allows for the transfer of air from one side of the piston to the other side and, therefore, provides for movement of the piston and rod in a direction opposite to the flow of air. A radial orifice is provided in the piston which communicates between the free end of the piston and the space between the pair of piston seals. The radial orifice compensates for the effect of the piston rod in moving the piston in one direction or the other. In this manner, the door control apparatus provides for an equal resistance in either opening or closing the door regardless of the orientation of the piston within the cylinder or the piston and cylinder combination in reference to the door or the wall. Moreover, the axially and radially orificed piston maintains the door in any partially opened or partially closed condition as is desired. The use of air within the cylinder, which is not under pressure and is therefore relatively compressible, imparts a cushioning effect when moving the door in either direction. These advantages are not achievable by the prior art door control mechanisms.

BRIEF DESCRIPTION OF THE DRAWINGS

Various other objects, advantages, and features of the invention will become apparent to those skilled in the art from the following discussion taken in conjunction with the following drawings, in which:

FIG. 5 is a front plan view, partially in cross section, of the piston and seal assembly of the inventive control door apparatus of the embodiment of FIG. 2;

FIG. 6 is a front plan view of another embodiment of the inventive movement control door apparatus attached to the door and wall of the cabin of FIG. 1; and, FIG. 7 is a front plan view, partially in cross section, of the embodiment of FIG. 6 illustrating the piston and seal assembly at one end and the rod seal assembly at the other end.

DESCRIPTION OF THE PREFERRED EMBODIMENTS

Figure 1:
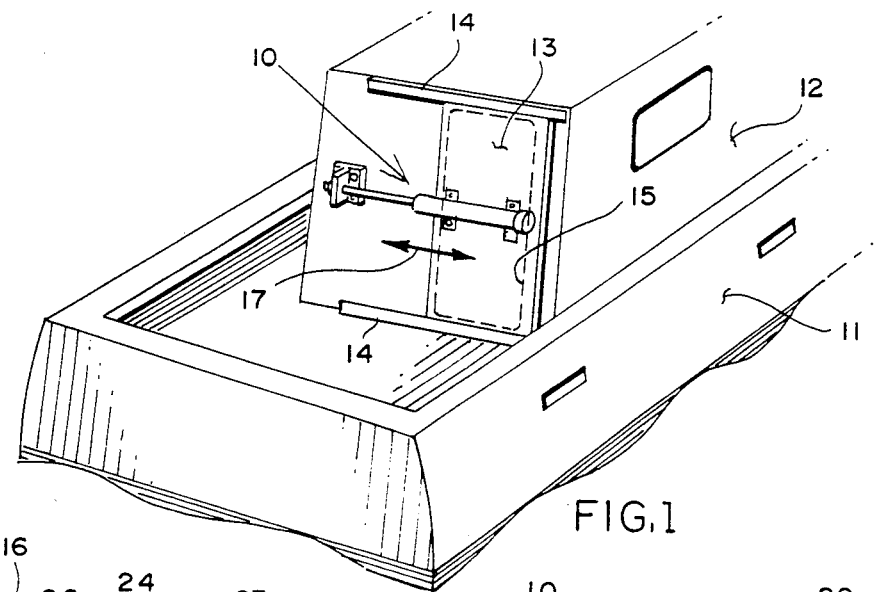
FIG. 1 comprises an isometric view of a partial portion of a boat having a cabin which utilizes a sliding door for access through a passageway in the wall of the cabin with the inventive apparatus being attached.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various figures are designated by the same reference numerals.

Figure 2:
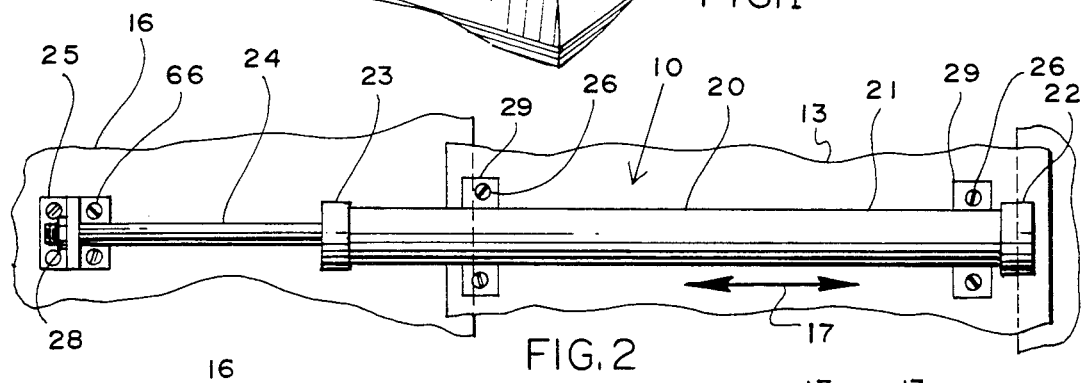
FIG. 2 is a front plan view of one embodiment of the door control mechanism, as provided for by the present invention, attached to the door and wall of the cabin of FIG. 1.
Figure 3:
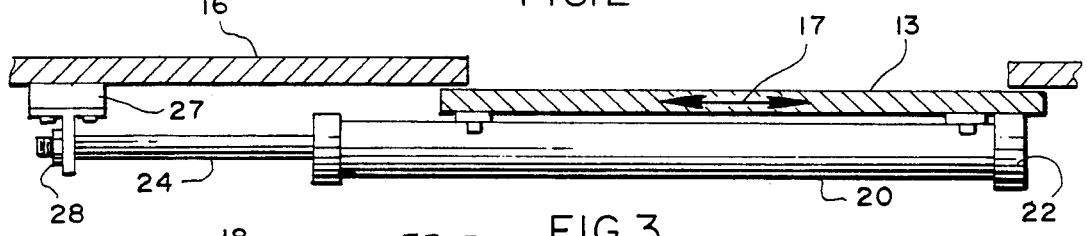
FIG. 3 is a top plan view of the door control apparatus of FIG. 2.

Reference is now made to FIGS. 1 through 3 of the drawings which, taken together, show the use of one embodiment of the inventive door control apparatus 10 as applied to a sliding door of a boat. In FIG. 1 a portion of a boat 11 is shown therein having a cabin 12 attached to the deck thereof. A back wall 16 of cabin 12 includes a doorway 15 which is covered by a sliding door 13 which slides open and closed on rails or tracks 14 at the upper and lower location of the door 13. In FIG. 1 door 13 is shown in the closed position. Door 13 may move sideways in either direction shown by arrows 17. The door control mechanism 10, as provided by the present invention, is seen in FIG. 1 to be attached at one end to the outside of door 13 and at its other end to the wall 16 of cabin 12. Door control apparatus 10 is oriented with the axial center line of piston rod 24 and cylinder 21 oriented in the same direction as the sideways motion of the door 13 in accordance with arrows 17. Door control apparatus 10 may be attached with cylinder 21 attached to door 13 and with piston rod 24 attached to wall 16 or vice-versa.

FIGS. 2 and 3 show an enlarged view of the door control mechanism 10 of FIG. 1. In FIGS. 2 and 3, door 13 and wall 16 are shown as broken portions with the door 13 being in a closed position. Accordingly, cylinder assembly 20 of the control door mechanism 10 is attached to door portion 13 while the free end of piston rod 24 is attached by a shoulder and a nut 28 to bracket 25, which is attached by screws 66, to block 27 which, in turn, is attached to wall 16. The cylinder assembly 20 of door control apparatus 10 is attached to door 13 by brackets 29 in conjunction with screws 26. Brackets 29 may be attached to cylinder 21 such as by welding or other appropriate means. Cylinder assembly 20 includes cylinder 21, a sealed end cap 22 and a rod end cap 23.

Figure 4:
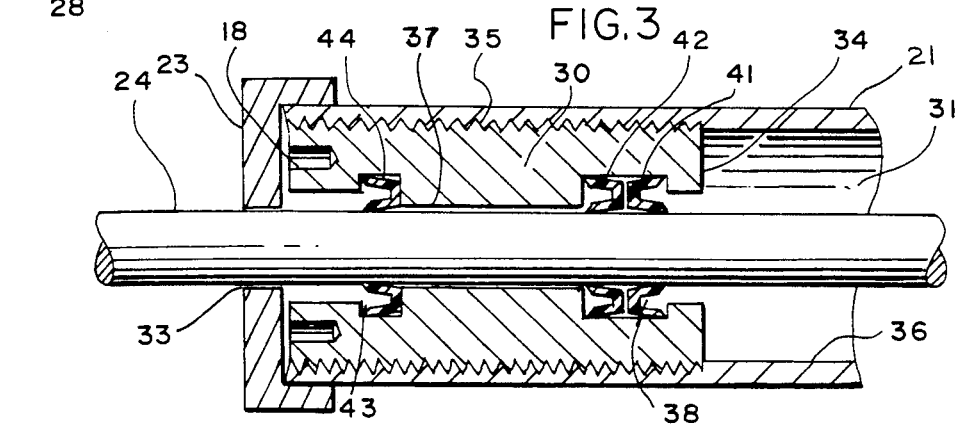
FIG. 4 is a front plan view, partially in cross section, of the piston rod seal portion of the inventive door control apparatus of the embodiment of FIG. 2.

Reference is now made to FIGS. 4 and 5 of the drawings, which together show the details of the interior configuration of the door control apparatus 10. In FIG. 4 the details of the piston rod seal assembly 30 are shown in conjunction with one end of cylinder 21 and piston rod 24. End cap 23 is fitted onto the rod end of cylinder 21. Since the rod seal assembly 30 confines the air 31 within cylinder 21, there is no need for a seal between end cap 23 and cylinder 21. End cap 23 may be threadingly connected 32 to the exterior of cylinder 21. A hole 33 through the center of the plate portion of cap 23 allows for passage therethrough of piston rod 24.

Piston rod seal assembly 30 includes a support structure 34 having a threaded 35 outer diameter for threadingly connecting to the inside diameter 36 of cylinder 21. Blind holes 18 provide for screwingly attaching piston rod seal assembly 30 within cylinder 21. A through axial hole 37 in rod seal support structure 34 provides for clearance for the passage therethrough of piston rod 24. A first annular cutout 38 in support structure 34 provides space and a seating surface for seals 41 and 42. Seals 41 and 42 have a outer periphery cross-sectional shape which approximates that of a squared letter "C". Seals 41 and 42 face away from each other and may be in back-to-back contact with each other. Seal 41 comprises a pressure holding seal, while seal 42 comprises a vacuum holding seal.

A second annular cutout 43 axially removed from or spaced from cutout 38 provides for the space of and a seating surface for seal 44. Seal 44 has the same peripheral cross-sectional shape as seals 42 and 43 and is oriented in the same direction as seal 42. Seal 44 comprises a wiper seal to wipe any water or other foreign material from rod 24 as it moves into cylinder 21. Accordingly, rod seal assembly 30 maintains the air 31 within cylinder 21 during periods of operation or even non-operation of the sliding door control apparatus 10. It is to be noted that the air 31 within cylinder 21 is at atmospheric pressure. Thus, when the inventive mechanism 10 is at rest, there is no differential pressure across any of the seals.

FIG. 5 reveals the details of the piston assembly 45 includes piston 50 which is attached to the end of piston rod 24 which is contained within cylinder 21 while moving axially within cylinder 21 in accordance with the movement 17 of door 13. End cap 22 is seen to be required to maintain the air 31 within cylinder 21, hence, it comprises a sealed end cap assembly which is threadingly connected 47 to cylinder 21. In this regard, seal 46 becomes compressed forming a sealing barrier when end cap 22 is fully threaded onto the end of cylinder 21.

Still referring to FIG. 5, piston 50 includes a through hole 51 which may be internally threaded 52 for approximately one-half of its length. The end of piston rod 24 may also be threaded 53 to permit engagement to threads 52 within opening 51 of piston assembly 45. Piston 50 has an outer diameter 54 which is slightly smaller than the inner diameter of cylinder 21 so as to permit non-binding movement of piston assembly 45 within cylinder 21. Piston 50 includes a pair of spaced annular cutouts 55 and 56, each of which provides a location and seating surface for seals 57 and 58, respectively. The overall configuration of seals 57 and 58 is the same as that of seals 42 and 41, respectively, but with seals 57 and 58 being larger in diameter and spaced an axial distance between each of other. Accordingly, the open portion of seals 57 and 58 face away from each other with axial clearance space 59 therebetween. Seal 57 prevents air 31 from passing piston assembly 45 when the motion of piston assembly 45 is in the direction of arrow 61. Seal 58 prevents air 31 from passing piston assembly 45 when the direction of motion of piston assembly 45 is in the direction of arrow 62.

Orifice 63, comprising a relatively small hole provided longitudinally through piston 50, provides for the transfer of air 31 from the left side of the piston assembly 45 to the right side thereof and vice-versa in order to allow piston assembly 45 to move in a direction opposite to the direction of the transfer of air 31. Since cylinder 21 is fixedly attached to door 13 and rod 24 is fixedly attached to wall 16 or vice-versa, the movement of piston assembly 45, relative to cylinder 21, provides for opening, closing, or the partial movement of door 13 relative to doorway 15. Another orifice 64, which, in practice, has been shown to be slightly smaller than orifice 63, is provided radially in piston 50 and between seals 57 and 58. Orifice 64 functions only when piston assembly 45 moves in the direction of arrow 62. Orifice 64 compensates for the volume of air occupied by piston rod 24 within cylinder 21. Thus, a larger, effective orifice (orifice 63 and orifice 64) exists when piston 45 is moving in the direction of arrow 62 as compared to a smaller orifice (solely 63) which operates when piston assembly 45 is moved in the direction of arrow 61.

Still referring to FIG. 5, it is seen that orifice 64 communicates between the through hole 51 in piston 50 and the space 59 between seals 57 and 58. Air 31, which is transferred to within space 59 when piston 45 is moving in the direction of arrow 62, bypasses around the outer periphery of seal 57 and, therefore, no special opening is provided for transferring this flow of air to the left side of piston 45. The cross-sectional squared "c" shape and orientation of seal 57 facing away from air 31 allows the outer surface of seal 57, which is flexible, to relatively easily deflect away from the inner diameter of cylinder 21 when air 31 is flowing through orifice 64 so as to permit the flow of air 31 out of cavity 59.

FIG. 6 illustrates another embodiment of the inventive mechanism 110 being attached to the wall 16 and door 13 of the cabin 12 of boat 11. Cylinder assembly 120, comprising cylinder 121 and end caps 122 and 123, is attached by brackets 129 and screws 126 to door 13. Piton rod 124 is attached by nuts 128 to bracket 125, which, in turn, is attached by screws 166 to block 127 which is attached to wall 16.

FIG. 7 is an enlarged view of the embodiment of the inventive mechanism 110 of FIG. 6. The piston assembly 145 includes a piston 150 which is attached to the end of piston rod 124, and moves axially within cylinder 121 in accordance with the movement 17 of door 13. End cap 122 sealingly functions as in the embodiment of FIG. 5 but is configured differently. A chamfer 170 on the edge of cylinder 121 seals against a similar chamfer on end cap 122. A thread sealant compound may also be used to further assure a sealed joint. End cap 122 is threaded 147 to the inner diameter 136 of cylinder 121. Blind holes 165 allow end cap 122 to be assembled to cylinder 121. Blind holes 165 allow end cap 122 to be assembled to cylinder 121. End cap 123 functions similarly to end cap 23 but is also configured differently. End cap 123 is proportioned to have the same size outer diameter as cylinder 121 and is threadingly connected 135 to the exterior of rod seal assembly 30. Hole 133 through the center of end cap 123 allows for the passage of piston rod 124 therethrough. Holes 169 allow for the drainage of any water trapped between the end of rod seal assembly 130 and end cap 123.

In the embodiment of FIG. 6, a blind hole 151 with threads 152 is provided axially within piston 150 for approximately one-half of its length. A threaded end 153 of piston rod 124 may be threadingly fitted within hole 151 to firmly attach piston rod 124 to piston assembly 145. Annular cutouts 155 and 156 are provided for seals 57 and 58 which provide for a location and a seating surface for seals 57 and 58, respectively. Seals 57 and 58 function in accordance with the movement 61 and 62 of piston assembly 145 as in the embodiment of FIG. 5.

An orifice 163, also comprising a small hole which is provided at one end of a larger axial hole 167 through piston 150 provides for the transfer of air from the left side of piston assembly 145 to the right side thereof and vice versa in accordance with the direction of movement of piston assembly 145. The movement of piston assembly 145 provides for opening, closing, or partial movement of door 13 relative to doorway 15 as in the embodiment of FIG. 5.

Blind axial hole 168 is provided partially through the length of piston 150 beginning at the piston side of air space 31 and extending to approximately the middle of the length of piston 150 between cutouts 155 and 156. A radial orifice 164 is provided between hole 168 and the space 159 between seals 57 and 58. Radial orifice 164 functions in the same manner as orifice 64 in the embodiment of FIG. 5. Seals 57 and 58 in FIG. 7 also functions as seals 57 and 58 in FIG. 5. Thus, orifice 164 is smaller than orifice 163. Blind axial hole 168 may be larger than orifice 164 so that the size of orifice 164 controls the transfer of air from the right side of piston assembly 145 past seal 57 to the left side of piston assembly 145 when piston assembly 145 moves in the direction of arrow 62.

Thus, in all respects, the embodiment of FIG. 6 functions the same as the embodiment of FIG. 2 as regards the movement of and the force required to move door 13.

In accordance with the above, an equal, steady force, but in opposite directions, may be applied to door 13 in order to either open or close door 13. For example, in order to close door 13, (assuming that the boat is not rocking sideways) a person would apply a steady force to the door in a direction to the right (FIG. 5). This causes the cylinder 20 to move to the right (FIG. 5). The air 31 on the left side of piston assembly 45 must, therefore, in part, be displaced to the right side (FIG. 5) for the cylinder 20 to move to the right. This is accomplished by the air 31 being transferred from the left to the right through orifice 63 and continues to be so transferred as long as the person applies the steady force to the door 13 to the right. The amount of the steady force needed is proportional to the cross-sectional area of air to be transferred, i.e. the cross-sectional area of the piston 30 less the cross-sectional area of the rod 24. To move the door 13 to the left and to open the door 13, the person applies a steady force to the door 13 to the left (FIG. 5). The force applied in this instance is again proportional to the cross-sectional area of the air transferred; but, in this instance, includes the cross-sectional area of rod 24. This is accomplished by the extra air being transferred through orifice 64, into space 59 and past seal 57 as well as by the air being transferred through orifice 63. Because of the extra flow path of the air (through orifice 64) when moving the door to the left, the same steady force is applied to the door as required to move the door 13 to the right. While any rocking back and forth (sideways) of the boat might affect these forces, the effect would not be significant. Moreover, this equal force is applicable regardless of the initial location of door 13 within doorway 15. Also, since there is no biasing force (spring or otherwise) present within door control apparatus 10 or 110, door 13 will remain in any position in which it is placed unless acted upon by a substantial external force. Thus, for all intents and purposes, normal rolling or pitching of a boat within waters will not cause door 13 to materially open further or close further from the then position of door 13. During rough weather conditions, however, door 13 may open or close slowly of its own accord to some degree, but will not slam open or closed. The size of orifices 63 and 64 and 163 and 164 determine the amount of force necessary to either open or close door 13.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the scope of the breadth and scope of the claims here appended.

I claim as my invention:

1. Control apparatus adapted for use with a sliding door, comprising
   a hollow cylinder,
   a cylindrically shaped piston, having a piston rod attached to one side thereof, slidingly located within said cylinder and proportioned for sliding axial movement relative thereto,
   air contained within said cylinder and present on both sides of said piston therein, and
   means for allowing an equal but opposite force to move said piston in either axial direction within said cylinder comprising:
      a pair of axially spaced seals located on a circumference of said piston, and bounding a flow space therebetween,
      a first orifice axially through said piston whereby air flow therethrough communicates with each of two side ends of said piston,
      a second orifice radially through said piston whereby air flow therethrough communicates with one of said side ends of said piston and with said flow space between said seals,
      one of said seals having a flexible outer surface whereby air flow through said second orifice into said flow space between the seals, unseals said flexible outer surface and allows air flow from said flow space to the other side end of said piston.

2. The apparatus of claim 1, wherein said radial orifice is smaller in diameter than said axial orifice.

3. The apparatus of claim 1, wherein said cylinder is attachable to said sliding door and a free end of said piston rod is attachable to a structure having a doorway therethrough.

4. The apparatus of claim 1, wherein said cylinder is attachable to a structure having a doorway therethrough and a free end of said piston rod is attachable to said door.

5. The apparatus of claim 1, including piston rod sealing means at one end of said cylinder and within said cylinder for allowing movement of said piston rod in and out of said cylinder while maintaining said air within said cylinder.

6. The apparatus of claim 1, wherein said seals on said piston have a generally annular shape with an axial cross-sectional shape approximating a squared letter "C" shape.

7. The apparatus of claim 6, wherein said C-shaped seals face away from each other.

8. The apparatus of claim 5, wherein said rod sealing means comprises a cylindrical member attached to an inner diameter of said hollow cylinder at one end thereof, an axial hole through the center of said cylindrical member, an annular cutout in said axial hole, and a pair of seals located within said annular cutout, one of said seals being a vacuum maintaining seal and other being a pressure maintaining seal.

9. The apparatus of claim 8, including a wiping seal located within a second annular cutout within said axial hole.

10. Control apparatus for controlling the movement of a sliding door comprising:
   a hollow cylinder;
   a piston having a rod attached to one side thereof, said piston located within said cylinder and for axial movement relative thereto;

means for allowing equal but oppositely directed forces to move said piston in either axial direction relative to said cylinder, said means comprising:
  a first orifice longitudinally through said piston for flow communicating a first end of said piston with a second end thereof;
  a second orifice for flow communicating with said first end of said piston; and
  means for communicating said second orifice with said second end of said piston in accordance with axial relative movement of said piston in one direction only,
said means for flow communicating said second orifice with said second end of said piston comprising a pair of axially spaced seals around said piston forming a space between said seals, said space being further bounded by an inner diameter of said cylinder and an outer diameter of said piston, said second orifice flow communicating said first end of said piston with said space, one of said seals having a flexible outer surface whereby flow through said second orifice into said space causes bypass flow past said flexible outer surface to the second end of said piston.

11. The apparatus of claim 10, wherein said seals have a generally annular shape with an approximate C-shaped cross sectional shape, said C-shaped seals being arranged on said piston with the opening of the C-shape facing away from each other.

* * * * *